United States Patent [19]

Schneider

[11] 3,952,991

[45] Apr. 27, 1976

[54] APPARATUS FOR EJECTING A WORKPIECE FROM A MOLD CAVITY

[75] Inventor: Philipp Schneider, Pappenheim, Germany

[73] Assignee: Krauss-Maffei Aktiengesellschaft, Munich, Germany

[22] Filed: Apr. 12, 1974

[21] Appl. No.: 460,573

[30] Foreign Application Priority Data
May 12, 1973 Germany............................ 2324212

[52] U.S. Cl.............................. 249/66 A; 264/335; 425/251; 425/252; 425/437; 425/DIG. 232; 425/DIG. 102

[51] Int. Cl.²........................................ B29C 7/00

[58] Field of Search....... 249/66 A; 425/130, 242 R, 425/251, 252, 257, 245, 817 R, 4 R, 244, 207, 817 R, 437, DIG. 232, DIG. 102; 264/335

[56] References Cited
UNITED STATES PATENTS

| | | | |
|---|---|---|---|
| 3,362,046 | 1/1968 | Blumer | 425/251 |
| 3,706,515 | 12/1972 | Keuleber et al. | 425/252 |

*Primary Examiner*—R. Spencer Annear
*Assistant Examiner*—Robert J. Charvat
*Attorney, Agent, or Firm*—Karl F. Ross; Herbert Dubno

[57] ABSTRACT

A mass of a hardenable synthetic resin such as polyurethatne is introduced into a mold cavity and is allowed to harden at least partially. Thereafter a piston having a face contiguous with an inside surface of the cavity is retracted away from the hardened mass in a bore formed in one of the mold halves. The mold is then opened and a gas is fed into the bore at a location between the retracted piston and the mass so as to pneumatically eject the hardened mass from the mold. The piston is formed with a plurality of circumferential grooves adjacent its face, these grooves filling with synthetic-resin material during use so as to form a seal around the piston. A pair of orifices open into the bore of this piston; one of the orifices is connected the source of pressurized gas, the other is connected to a passage opening into the atmosphere. The piston is formed with a lateral groove constituting a chamber into which both of the orifices open when the piston is in the advanced or molding position so that gas does not leak into the mold cavity of the piston, but is exhausted to the atmosphere.

4 Claims, 5 Drawing Figures

APPARATUS FOR EJECTING A WORKPIECE FROM A MOLD CAVITY

CROSS-REFERENCE TO RELATED APPLICATIONS

This application is related to the commonly assigned and copending applications Ser. No. 212,186 filed 17 Dec. 1971 and Ser. No. 425,114 filed 17 December 1973.

FIELD OF THE INVENTION

The present invention relates to an apparatus for molding a workpiece of synthetic resin. More particularly this invention concerns an apparatus for ejecting a synthetic-resin workpiece from the mold in which it was formed.

BACKGROUND OF THE INVENTION

Objects molded of synthetic resin are usually formed in a mold cavity defined between two mold halves. The halves are closed together and the synthetic-resin material is injected into this cavity where it allowed to harden.

Two principal methods exist to eject the hardened or semihardened workpiece from the mold cavity. The most common method simply mechanically punches this workpiece out. Such an arrangement is disadvantageous in that it frequently damages the workpiece, especially when made of a synthetic resin such as polyurethane which does not harden rapidly. An attempt has been made to avoid this disadvantage by providing a punch of mushroom shape, having an enlarged head which is used to press the workpiece out of the mold cavity. Such an arrangement has the considerable disadvantage that unhardened synthetic-resin material frequently finds its way underneath the enlarged head of the punch and thereby prevents it from being fully retracted afterward. Thus the device must be disassembled and cleaned thoroughly.

Another known method of ejecting a synthetic-resin workpiece from a mold cavity uses gas pressure. With such an arrangement an orifice is formed within the inner wall of the mold cavity and is connected to a source of pressurized gas. After the molding operation is completed this gas is forced through the orifice into the mold chamber beneath the hardened or partially hardened workpiece, thereby pneumatically pressing the workpiece out of the mold cavity. This system is not usable with synthetic resins which are very thin when in a fluid state. Polyurethane for instance in its liquid form frequently can enter gaps and orifices having maximum open widths of 1 micron so that when such a synthetic resin is used the orifice is plugged after a few cycles. In addition the gas as it enters through the small orifice frequently damages the still-soft molded article. Yet another disadvantage of this pneumatic workpiece ejection is that the orifice provided in the mold cavity for admission of the gas leaves a bump on the surface of the molded article, a disadvantage which frequently makes the workpiece unusable.

OBJECTS OF THE INVENTION

It is therefore an object of the present invention to provide an improved apparatus for molding a workpiece of synthetic resin.

Another object is to provide an improved apparatus for ejecting a workpiece from a mold cavity.

A further object is to provide an improved pneumatic ejection system which overcomes the above-given disadvantages.

SUMMARY OF THE INVENTION

These objects are attained according to the present invention in a molding system wherein a mass of hardenable synthetic-resin material is introduced into a cavity of a mold and allowed to harden at least partially. Thereafter a piston having a face contiguous with an inside surface of the cavity is retracted away from the hardened mass in a bore formed in the mold. Thereafter the mold is opened and a gas is fed into the bore between the retracted face of the piston and the mass. This gas build pressure up beneath the workpiece and presses it out of the mold cavity.

The apparatus according to the present invention comprises a mold having a cavity one of whose walls is at least partially formed by a face of a piston which is displaceable away from the mold cavity in a bore so as to uncover a gas-injection orifice which opens into the bore. With this type of arrangement the gas-injection orifice is covered during the molding operation so that a bump will not be formed on the outside surface of the workpiece. In addition the gas will be effective over a relatively large surface area of the at least partially hardened workpiece wo that it will not damage this workpiece.

In accordance with further features of this invention the piston-receiving bore is formed with a pair of such orifices, one connected to means for introducing the gas, usually air, into the bore, and the other connected to a lower-pressure outlet from which gas can escape. In the molding or advance position of the pisong a groove or chamber formed on the piston connects these two orifices together so that any gas pressure in the inlet line will be bled away through the outlet and not leak around the piston to the mold cavity, thereby potentially damaging the molded article. In the retracted position the piston face lies between these two orifices, exposing the inlet orifice to the mold cavity and blocking air flow from the inlet to the outlet orifice.

In accordance with yet another feature of this invention the piston is provided adjacent its face with at least one circumferential groove. In this manner the piston effectively forms its own sealing rings since inevitably a certain amount of synthetic-resin material enters these grooves, and thereby form a constantly renewed and custom-fitting seal which fits the piston bore exactly.

According to yet another feature of the invention the mold half opposite that mold half provided with the ejecting piston is formed with another piston axially reciprocal towaard and away from the mold cavity in a bore opening into this mold cavity. This second piston is formed with a pair of axially extending grooves which in an advance position of the piston each connect together two respective lines. One of the lines for each of the grooves is connected to a high-pressure side of a source of one of the components of a synthetic-resin mixture and the other line of each of these respective grooves is connected to the low-pressure side of the respective source so that during the molding operation the two components can be continuously circulated through the respective grooves so as to prevent inadvertent hardening, whereas during molding the piston can be retracted to cover the outlet holes and allow the two components to enter the bore and mix together.

Thereafter advancing of the piston forces the mass tightly into the mold cavity.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
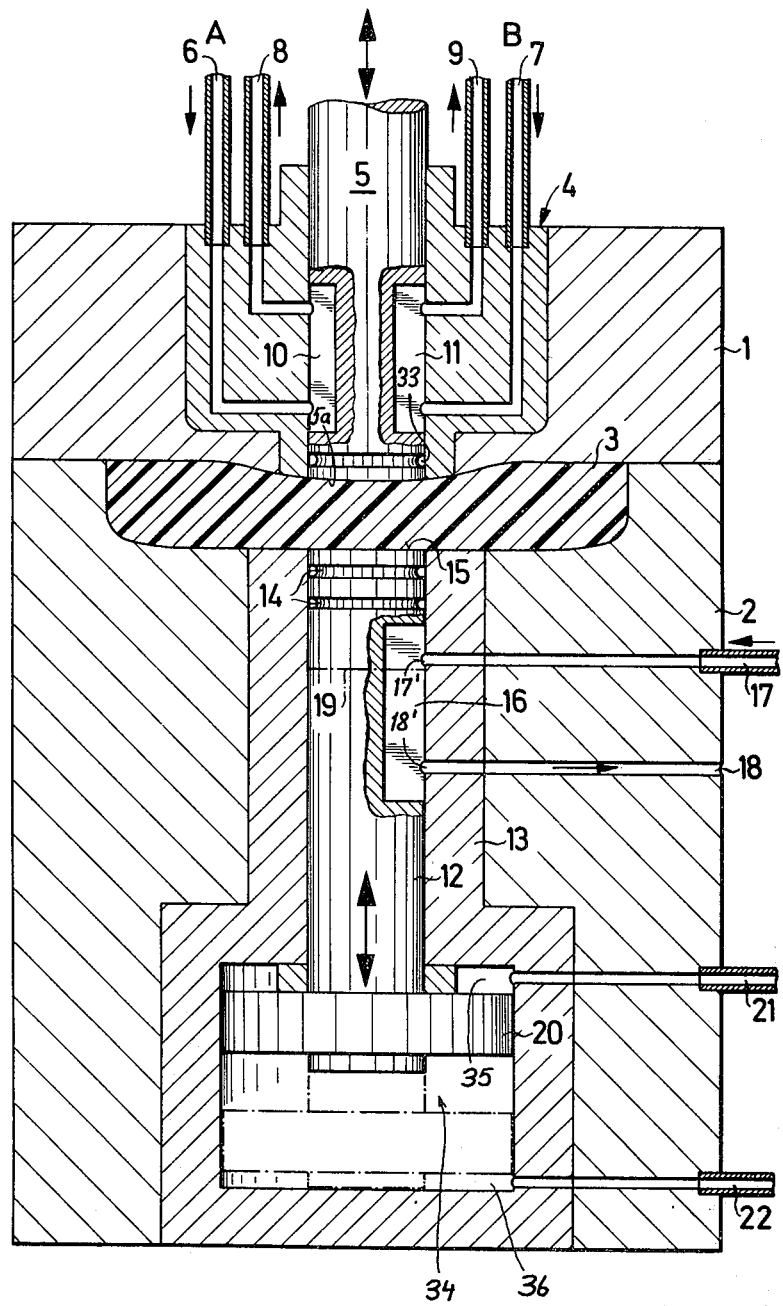
FIG. 1 is an axial section through the apparatus according to the present invention.

As shown in FIG. 1 the mold according to the present invention comprises an upper mold half 1 and a lower mold half 2 which together form a workpiece or mold cavity 3 of generally disk-like shape. The upper mold half 1 is adapted to be fitted to the head 4 of an injection molding machine of the type known in the art and having an axially reciprocal piston 5 which is operated as shown in FIG. 2B by a hydraulic cylinder 29. This injection head 4 is provided with two inlet conduits 6 and 7 and two outlet conduits 8 and 9 for admitting and exhausting a continuous flow of the two synthetic-resin components here molded to form a workpiece W. Thus di- or polyisocyanate is introduced into the conduit 6 and exhausted through the conduit 8 and di- or polyol is introduced in the conduit 7 and exhausted through the conduit 9, as described in the above-cited copending applications. The axially reciprocal mixing piston 5 is formed with a pair of grooves 10 and 11 constituting passages allowing fluid flow between conduits 6 and 8 and conduits 7 and 9, respectively. The piston 5 is formed adjacent its face 5a with a circumferential groove 33 of semicircular cross section adapted to fill with synthetic-resin material during operation of the mold so as to form a custom seal.

The mold wall 2 is provided with a cylinder element 13 formed with bore 31 in which is axially reciprocal a cylindrical piston 12 having a planar face 15 positionable as shown in FIGS. 1 and 2B so as to be contiguous with the inner surface 3' of the mold cavity 3. This piston 12 is formed with a pair of circumferential semicircular-section grooves 14 which are adapted to fill with synthetic-resin material like the groove 33. In addition this piston 12 is formed laterally with a groove 16 which in the upper position illustrated in FIG. 1 allows for fluid flow between two orifices 17' and 18' serving as the mouths of passages or conduits 17 and 18. The piston 12 is provided on its lower end with a large-diameter piston 20 displaceable in both directions in a cylinder 34 formed in the cylinder member 13. The piston 20 subdivides the cylinder 34 into an upper chamber 35 connected to a conduit 21 and a lower chamber 36 connected to a conduit 22, both of these conduits being connected to a reversing valve 25 whose other side is connected to a pump 26 and a reservoir 27.

Figure 2A:
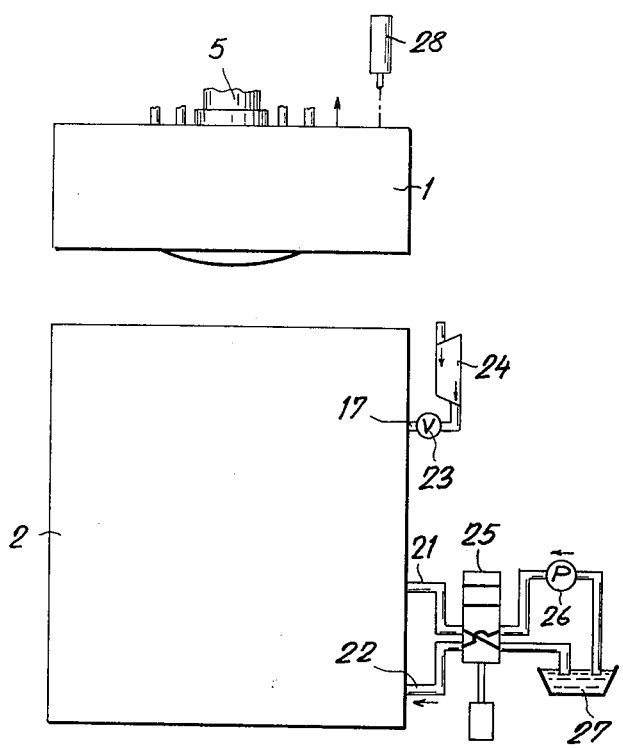
FIGS. 2A – 2D are partly sectional side views illustrating the operation of the apparatus shown in FIG. 1.
Figure 2B:
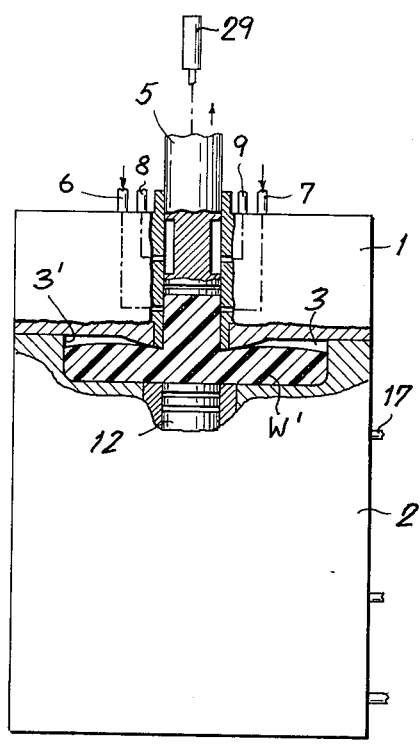

The conduit 17 is provided with a valve 23 which connects it to a blower or a compressor 24 shown in FIG. 2A, whereas passage 18 opens to the atmosphere.

The apparatus operates as follows:

As shown in FIG. 2A the mold is originally opened by means of a hydraulic cylinder 28 effective on its upper half 1. The valve 23 is closed and the valve 25 is in a position in which it feeds fluid via conduit 22 into the lower chamber 36 and thereby biases the piston 12 into the advanced or up position.

Then as is shown in FIG. 2B the upper half 1 is dropped down tightly into engagement with lower half 2 by means of the cylinder 28 and the piston 5 is retracted by the cylinder 29 until its face 5a clears the outlet orifices of conduits 6 and 7. Thus the two polyurethane components flow into the bore of piston 5 and down into the mold cavity 3 forming a synthetic-resin mass W'. In the position of the mold the piston 12 is left in the raised position and the valve 25 is held in the position shown in FIG. 2A.

Figure 2C:
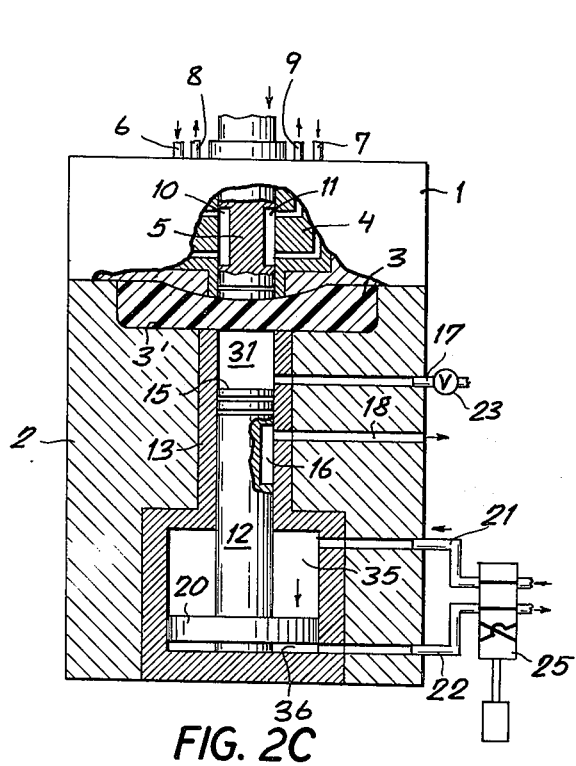

The piston 5 then is pressed down by its cylinder 29 as shown in FIG. 2C, thereby restoring circulation between conduits 6 and 8 on one side and 7 and 9 on the other. This action forces the synthetic-resin mass W' to fill the cavity 3 completely and tightly. Thereafter as shown also in FIG. 2C the valve 25 is reversed so as to pressurize the chamber 25 and drain the chamber 36, thereby dropping the face 15 of piston 12 down to a level shown at dot-dash line 19 in FIG. 1 below the orifice 17'. This action forms a cylindrical chamber communicating with the conduit 17.

Figure 2D:
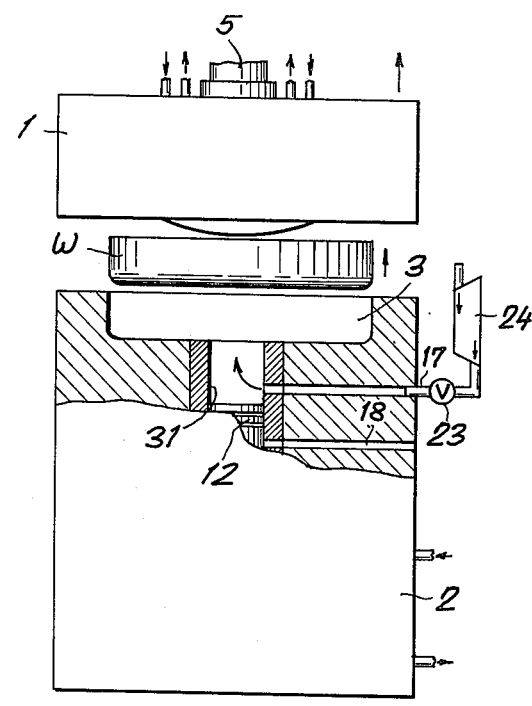

Thereafter as shown in FIG. 2D the valve 23 is opened to admit air to the bore 31 above the face 15 of the piston, thereby forcing the partially hardened workpiece W out of the mold, which has meanwhile been opened by means of cylinder 28.

Thereafter the valve 23 is closed and the valve 25 reversed so as to return the apparatus to the position shown in FIG. 2A for another cycle.

The workpiece W so formed is readily ejected from the mold cavity 3 without being damaged, as the air pressure is effective on it over a circular area of relatively large diameter. The bore 31 does not become fouled and filled with pieces of synthetic-resin material as piston 12 effectively scrapes it clean each time it is lifted into the advanced position as shown in FIG. 1. The small amount of synthetic-resin material which does find its way between the piston 12 and its bore 1 fills the circumferential groove 14 and forms an extremely tight seal therein. The provision of the outlet passage 18 insures that, even if there should be leakage past the valve 23, air will not bleed past the piston 12 up into the cavity 3 thereby deforming the workpiece. As a matter of fact it is possible to dispense with this valve 23.

I claim:

1. An apparatus for ejecting a workpiece, said apparatus comprising:
    a mold having a cavity;
    a cylinder formed with a bore opening into said cavity at a surface thereof;
    a reciprocable piston having an end face and displaceable in said bore between a mold position with said face contiguous with said surface and an eject position with said face retracted in said bore from said surface;
    a conduit opening into said bore at a location between said face and said surface with said piston in said eject position; and
    means for introducing a gas into said bore through said conduit with said piston in said eject position to eject an object from said cavity with the gas thus introduced.

2. The apparatus defined in claim 1 wherein said piston is formed adjacent said face with at least one circumferential groove, whereby said groove fills with molding material constituting a seal in said groove.

3. The apparatus defined in claim 1 wherein said piston is formed with a lateral recess, said conduit opening into said bore at said recess with said piston in said mold position, said apparatus further comprising an outlet conduit at lower gas pressure than the first-mentioned conduit and opening into said bore at said recess with said pistion in said mold position.

4. The apparatus defined in claim 1 wherein said mold has two separable halves defining said cavity.

* * * * *